US006934854B2

(12) United States Patent
Brücklmeier et al.

(10) Patent No.: US 6,934,854 B2
(45) Date of Patent: Aug. 23, 2005

(54) CIRCUIT AND METHOD FOR PROTECTING ELECTRONIC DEVICES

(75) Inventors: Eric-Roger Brücklmeier, München (DE); Herbert Palm, Höhenkirchen (DE); Andreas Kux, Haar (DE)

(73) Assignee: Infineon Technologies AG, Munich (DE)

( * ) Notice: Subject to any disclaimer, the term of this patent is extended or adjusted under 35 U.S.C. 154(b) by 704 days.

(21) Appl. No.: 10/086,296

(22) Filed: Mar. 1, 2002

(65) Prior Publication Data

US 2002/0129258 A1 Sep. 12, 2002

Related U.S. Application Data

(63) Continuation of application No. PCT/DE00/03004, filed on Sep. 1, 2000.

(30) Foreign Application Priority Data

Sep. 1, 1999  (DE) .......................................... 199 41 682

(51) Int. Cl.⁷ .............................................. G06F 17/00
(52) U.S. Cl. ............................ 713/200; 713/189; 713/1
(58) Field of Search ................................ 713/300–340, 713/189–202, 1–2

(56) References Cited

U.S. PATENT DOCUMENTS

| 4,484,067 A | 11/1984 | Obrecht |
| 4,851,653 A | 7/1989 | Limisaque et al. |
| 5,559,505 A | 9/1996 | McNair |
| 5,594,227 A | 1/1997 | Deo |

FOREIGN PATENT DOCUMENTS

| DE | 42 42 579 C2 | 6/1994 |
| DE | 195 48 903 C2 | 8/1996 |
| DE | 197 56 895 A1 | 8/1999 |
| DE | 198 18 998 A1 | 11/1999 |
| EP | 0 809 217 A2 | 11/1997 |

OTHER PUBLICATIONS

VLSI implementation of password (PIN) authentication unit Sklavos, N.; Kitsos, P.; Koufopavlou, O.; Electronics, Circuits and Systems, 2002. 9th International Conference on , vol.: 3 , Sep. 15–18, 2002.*

A 128K EPROM using encryption of pseudorandom numbers to enable read access Letham, L.; Hoff, D.; Folmsbee, A.; Solid–State Circuits, IEEE Journal of , vol.: 21 , Issue: 5 , Oct. 1986.*

Development of a remotely accessible integrated circuit test facility based on telepresence Chung, E.C.; Titus, A.H.; Instrumentation and Measurement Technology Conference, 2000. IMTC 2000. Proceedings of the 17th IEEE , vol.: 3 , 1–4.*

* cited by examiner

*Primary Examiner*—David Jung
(74) *Attorney, Agent, or Firm*—Laurence A. Greenberg; Werner H. Stemer; Ralph E. Locher

(57) ABSTRACT

The access time for the use of an electronic device, for example a chip, is prolonged after each unauthorized access attempt. The access time is determined by the time for the matching of the turn-on voltages of two floating gate cells. Before an access attempt, the turn-on voltage of one cell is set to a predefined initial value and the turn-on voltage of the other cell is set to a value which is higher in comparison and which is increased after each unauthorized access.

10 Claims, 3 Drawing Sheets

CIRCUIT AND METHOD FOR PROTECTING ELECTRONIC DEVICES

CROSS-REFERENCE TO RELATED APPLICATION

This application is a continuation of copending International Application Ser. No. PCT/DE00/03004, filed Sep. 1, 2000, which designated the United States.

BACKGROUND OF THE INVENTION

1. Field of the Invention

The present invention relates to an electronic circuit and a method for protecting electronic devices, in particular for protecting the enabling of chip functions.

Certain forms of electronic circuits, for example chip cards, require a high degree of secrecy of the information or stored data contained in the circuit (for example keys in encryption technology). This information which relates to safety must be protected both against analyses by third parties and against manipulation. It is necessary in particular to avoid unauthorized persons acquiring access to the information by repeating unauthorized access attempts to the respective electronic device with such frequency that analysis of the security-related information or access is made possible. This may be the case, for example, if a PIN is discovered through repeated trials. A chip or chip card is therefore protected in such a way that after a certain number of unauthorized access attempts any further access attempt, and therefore as a rule even an authorized access, is prohibited. The security measures are then in certain circumstances too rigid because, for example, even the person with access authorization is no longer allowed access after, for example, only two inadvertent failed attempts. It is also possible for such an event to occur in the case of a defect in the terminal, which leads to the access authorization not being correctly detected by the terminal.

SUMMARY OF THE INVENTION

It is accordingly an object of the invention to provide a circuit and a method for securing electronic devices, which overcome the above-mentioned disadvantages of the heretofore-known devices and methods of this general type and which provide a novel technical teaching for protecting the enabling of the function of an electronic device which provides sufficient protection against misuse and at the same time prevents a situation in which use authorization is prematurely denied owing to operator control errors or malfunctions.

With the foregoing and other objects in view there is provided, in accordance with the invention, an electronic circuit for protecting electronic devices, comprising:

a first component and a second component each having an electrical variable of the same type;

a third component for comparing values of the electrical variable of the first component and of the second component with one another;

a setting device for setting a value of the electrical variable of the first component and of the second component;

a matching device for matching the value of the electrical variable of the first component to the value of the electrical variable of the second component, starting from a basic value, and during a given period of time;

a checking device for checking whether an authorized use of the electronic device is properly initiated, executed, and terminated, and, in case of unauthorized or improper use, the checking device bringing about a change in the value of the electrical variable of the second component or a change in the matching device such that the period of time necessary to match the value of the electrical variable of the first component to the value of the electrical variable of the second component by the matching device is prolonged.

With the above and other objects in view there is also provided, in accordance with the invention, a method of protecting electronic devices, which comprises:

providing an electronic circuit with first and second components each having an electrical variable of the same type, and a device for setting a value of the electrical variable in each of the first and second components;

ensuring that a use of the electronic device lasts at least as long as is required for an electronic process that takes a specific time to match a predefined basic value of the electrical variable of the first component to a respective value of the electrical variable of the second component functioning as a reference value; and as a result of an unauthorized access attempt or as a result of an improper use, prolonging the specific time taken by the electronic process by one of changing the reference value and changing a speed of the matching operation.

In other words, the circuit according to the invention and the associated method according to the invention increase the access time, i.e. the time between the start of an access attempt and the enabling or execution of a function of the electronic device, for example of a chip, in the case of unauthorized access operations. As a result, a DP (differential power) analysis is effectively prevented because the time required for it is increased to such an extent that it is virtually impossible to carry out. When the means provided for an authorized access are used in accordance with the regulations, the number and the frequency of the access operations to the electronic device are not restricted. At the same time, the method or the use of the circuit is highly tolerant to access attempts which fail owing to inadvertent operator errors or equipment faults.

The circuit according to the invention comprises two components which are characterized by a common electrical variable, for example a voltage or a charge. In one of the components, this electrical variable can be approximated to a reference value within the course of a specific time interval, starting from a value which is different from the reference value, referred to below as the basic value. In the other component, the electrical variable can preferably be set, or programmed, to different values so that in each case there is thus a reference value which can be changed. There is a third component which is provided for comparing the values of the electrical variable of the two above-mentioned components.

The components can be formed, for example, by two floating gate cells or by two capacitors or the like if the third component is a comparator which is provided for the comparison of electrical voltages. In one preferred embodiment with floating gate cells, the turn-on voltage is selected as an electrical variable. The turn-on voltage of the first floating gate cell is chronologically changed and compared, by means of a comparator, with the turn-on voltage of the second floating gate cell which forms the reference value. If an access attempt is made to use the electronic device, for example when a chip card is introduced into a card reader and a PIN is input, the first floating gate cell is charged, starting from a value which is different from the reference value, the value being the basic value, until the comparator detects correspondence between the turn-on voltages of the cells.

After an unauthorized access attempt is detected, the above-defined access time is increased by changing the reference value or by decreasing the speed with which the values are approximated to one another. Unauthorized access attempts thus prolong the time to be waited until, in the case of a subsequent access, the function is enabled or, for example, in the case of a chip card, a cryptoalgorithm for checking a key finishes. This makes a DP analysis considerably more difficult because, even after a small number of unauthorized access attempts, the time up to a possible use of the function has drastically increased. The access time can be prolonged after any unauthorized access attempt or only if additionally determined predefined conditions are fulfilled.

Several variations of the novel method are possible. The following provides an overview over four sequences which encompass the invention. The method variations comprise:

in a first step, checking whether the value of the electrical variable of the first component corresponds to a predefined basic value;

in a second step, if the value of the electrical variable of the first component corresponds to the predefined basic value, proceeding to the following third step and, if the value of the electrical variable of the first component does not correspond to the predefined basic value, setting the value of the electrical variable of the first component to the basic value and setting the value of the electrical variable of the second component to a new reference value, so that the specific time taken by the electronic process is prolonged;

in a third step, executing the electronic process until the values of the electrical variable of the two components match one another;

in a fourth step, checking whether authorization exists to use the electronic device;

in a fifth step, if authorization exists, rendering possible the use of the electronic device and, if authorization does not exist, setting the value of the electrical variable of the second component to a new reference value, so that the time taken by the electronic process is prolonged; and in a sixth step, setting the value of the electrical variable of the first component to the basic value.

Alternatively, the novel method is broken down as follows:

in a first step, checking whether the value of the electrical variable of the first component corresponds to a predefined basic value;

in a second step, if the value of the electrical variable of the first component corresponds to the predefined basic value, proceeding to the following third step and, if the value of the electrical variable of the first component does not correspond to the predefined basic value, setting the value of the electrical variable of the first component to the basic value and setting the value of the electrical variable of the second component to a new reference value, so that the specific time taken by the electronic process is prolonged, and executing the electronic process until the values of the electrical variable of the two components match one another;

in a third step, checking whether authorization exists to use the electronic device;

in a fourth step, if authorization exists, executing the electronic process until the values of the electrical variable of the two components correspond and rendering possible the use of the electronic device and, if authorization does not exist, setting the value of the electrical variable of the second component to a new reference value, so that the time taken by the electronic process is prolonged; and in a fifth step, setting the value of the electrical variable of the first component to the basic value.

In a further alternative embodiment of the novel method, the sequence comprises:

in a first step, checking whether the value of the electrical variable of the first component is equal to the value of the electrical variable of the second component;

in a second step, if the values of the electrical variables are equal, proceeding with the system to the following third step and, if the values are not equal, setting the value of the electrical variable of the second component to a new reference value, so that the time taken by the electronic process is prolonged;

in a third step, setting the value of the electrical variable of the first component to a predefined basic value different from the reference value;

in a fourth step, executing the electronic process until the values of the electrical variable of the two components correspond;

in a fifth step, checking whether authorization exists to use the electronic device; and in a sixth step, if authorization exists, rendering possible the use of the electronic device and, if authorization does not exist, setting the value of the electrical variable of the second component to a new reference value, so that the time taken by the electronic process is prolonged.

In accordance with a concomitant feature of the invention, the method comprises:

in a first step, checking whether the value of the electrical variable of the first component is equal to the value of the electrical variable of the second component;

in a second step, if the values of the electrical variables are equal, proceeding with the system to the following third step and, if the values are not equal, setting the value of the electrical variable of the second component to a new refer- ence value, so that the time taken by the electronic process is prolonged, and executing the electronic process until the values of the electrical variable of the two components correspond;

in a third step, setting the value of the electrical variable of the first component to a predefined basic value different from the reference value;

in a fourth step, checking whether authorization exists to use the electronic device;

in a fifth step, if authorization exists, executing the electronic process until the values of the electrical variable of the two components correspond and rendering possible the use of the electronic device and, if authorization does not exist, aborting the process.

Other features which are considered as characteristic for the invention are set forth in the appended claims.

Although the invention is illustrated and described herein as embodied in a circuit and method for protecting electronic devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
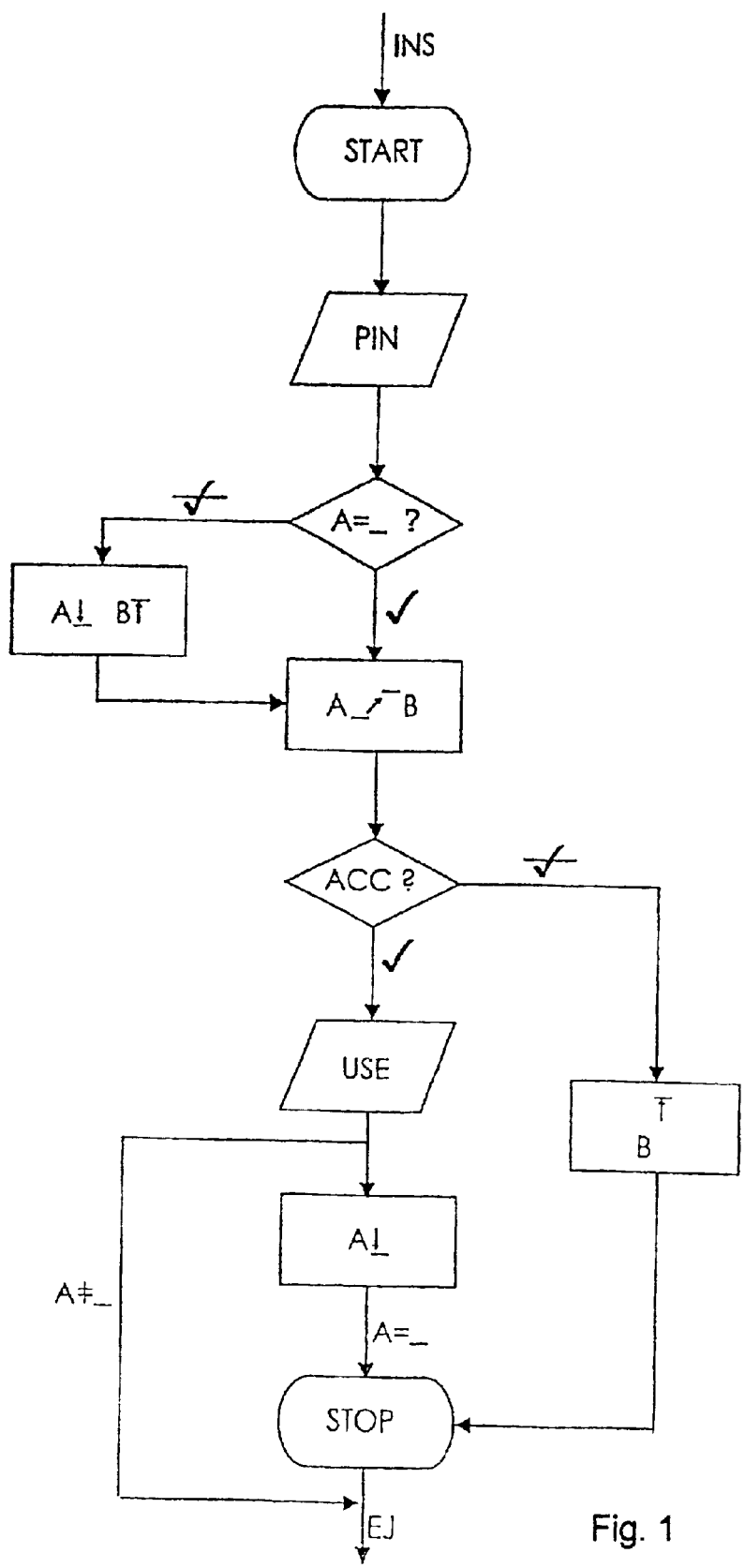
FIG. 1 is a flowchart illustrating a method according to the invention.

A more precise description of exemplary embodiments of the invention will follow with reference to the program flowcharts represented in the three figures of the drawing. For the sake of more simple designations, it will be assumed in each case that the electronic components of the circuit are two floating gate cells and a comparator which, in this example, compares the turn-on voltages of the cells with one another as the electrical variable.

Referring now to the figures of the drawing in detail and first, particularly, to the flowchart of FIG. 1 thereof, there is shown a first exemplary embodiment of the invention. The value of an electrical variable of the first component (one of the floating gate cells, referred to below as cell A) is set to a specific basic value (a specific turn-on voltage $U_{A0}$) before it is first detected whether there is an authorization to use the electronic device, that is to say for example before the first insertion of a chip card into the chip card reader, and the value of the electrical variable of the second component (the other floating gate cell, referred to below as cell B) is set to a reference value which is different therefrom in a predefined way (different turn-on voltage $U_{B0}$, preferably higher than $U_{A0}$). The components are thus in their basic states. In the case of a chip card, an access attempt is typically initialized by introducing the card into a card reader (INS-START) and inputting a PIN or comparable data. It is then firstly checked whether the first component (cell A) is in the basic state (with the turn-on voltage at the basic value $U_{A0}$). If this is the case (A=__ ? ✓), the checking of the access authorization is started by firstly slowly adjusting the value of the electrical variable of the first component (turn-on voltage $U_{A0}$ of the cell A) to the reference value (turn-on voltage $U_{B0}$ of the cell B), (A__↗B by charging cell A, for example by means of a sequence of short pulses or by means of a programming voltage which is reduced in comparison to normal operation). The functions of the electronic device which are to be used are enabled, in the case of an authorized access, after checking of the access authorization (ACC ? ✓) only if both components have the same value of the electrical variable (reference value, specifically the same turn-on voltage), or the absolute value of the difference between the values is less than a predefined low value, which is determined by the comparator in the example.

After the user has used (USE) the functions of the electronic devices, that is to say for example at the end of an executed chip (card) function, the first component (cell A) is returned (A↓__) to the basic state (turn-on voltage at the basic value $U_{A0}$). The circuit is thus initialized (A=__) for the next access attempt, for example to the functions of a chip. The use is terminated (STOP-EJ) in a conventional way (with the ejection of the card in the case of the chip card). If use is prematurely aborted, the first component (cell A) still has a value of the electrical variable which is different from the basic value (A≠__, turn-on voltage of cell A is different from $U_{A0}$) when the next access attempt starts.

In the original state, for example when a chip protected with a circuit according to the invention is issued to the purchaser, the basic states of the components are set in such a way that, when the value of the first component changes over time (charging of the first cell A), the reference value (the turn-on voltage of the cell B) is reached in a very short time so that the enabling of the functions of the electronic device (of the chip functions in this case) is not perceptibly delayed.

After an unauthorized access attempt (ACC ? not ✓), it is ensured, by suitable means, known per se, of the electronic circuit, that an approximation of the values of the components (turn-on voltages of the cells) takes longer than previously. This occurs preferably even if an authorized access to the use is prematurely aborted. In the case of an embodiment with floating-gate cells and a lower turn-on voltage of the cell A than the basic value, and with a higher turn-on voltage of the cell B than the reference value, the turn-on voltage of the second cell B can be increased somewhat (B↑__, for example by means of a brief programming pulse) to a new, higher reference value so that it takes longer until the first cell A is charged, starting from the basic state, to such an extent that the turn-on voltages of both cells correspond. The consequence is that the access time is increased. If it is determined at the start of the access attempt that the cell A is not in the basic state (A=__ ? not ✓, for example abort of the last access), in this exemplary embodiment the turn-on voltage of cell A is set (A↓__) to the basic value $U_{A0}$, and the turn-on voltage of cell B is changed to a value which differs more greatly from it than the new reference value (in the example increased further, B↑__). The approximation of the turn-on voltages does not take place until now.

The conditions are preferably set in such a way that, up to a number of failed access attempts (up to, for example, several hundred depending on the application) which is permitted with respect to security issues, the prolonged access time does not yet perceptibly restrict the benefit of the electronic device in the practical application, for example of the chip. The circuit according to the invention is preferably constructed in such a way that above a predefined number of unauthorized access attempts the time period for the approximation of the turn-on voltages of the cells rises very greatly so that it is virtually impossible still to carry out a DP analysis.

The circuit is preferably conditioned in such a way that, to be on the safe side, the access time is prolonged even when an access attempt is aborted. This is determined by the interrogation as to whether the first component (cell A) is in the basic state (A=__ ?). If the access attempt is aborted after the approximation of the values of the electrical variable of the components (for example turn-on voltages of the floating gate cells) has started, so that the first component (cell A) is not in the basic state, the value of the first component is preferably reset to the basic value (the turn-on voltage of the cell A to $U_{A0}$) at the start of the next access attempt, and the reference value (the turn-on voltage of the cell B) is changed as a precaution (increased in the present example) as if it had been determined at the previous access attempt that there was no use authorization or access authorization. This ensures that the circuit according to the invention is in a state of very short access times only if exclusively authorized accesses took place, and were satisfactorily terminated, before. If the voltage level of a floating gate cell A is not sufficient to determine whether the turn-on voltage of this cell has been reset to the basic value after an authorized and terminated access, an additional cell can be used for this evaluation (for example a digital flag cell).

In order to adapt the dependence of the access time on the number of previous non-authorized access attempts in an optimum way, the change in the reference value stored in one of the components, for example the programming of the cell B whose turn-on voltage is progressively increased at unsuccessful or aborted access attempts, can be controlled as a function of the respective state of this component (for example by means of dynamic adaptation of the programming voltage or programming period). If floating gate cells are used, it is possible, instead of changing the turn-on voltage of the cell B after each failed or aborted access attempt, to bring about the prolonged access time by increasingly delaying the charging of the cell A for the approximation of the turn-on voltages, e.g. by changing the basic value of the turn-on voltage of the cell A or by slowing down the charging process. However, in contrast to the preferred exemplary embodiment described above, this requires a further circuit component for registering the access attempts which have not been satisfactorily terminated.

Figure 2:
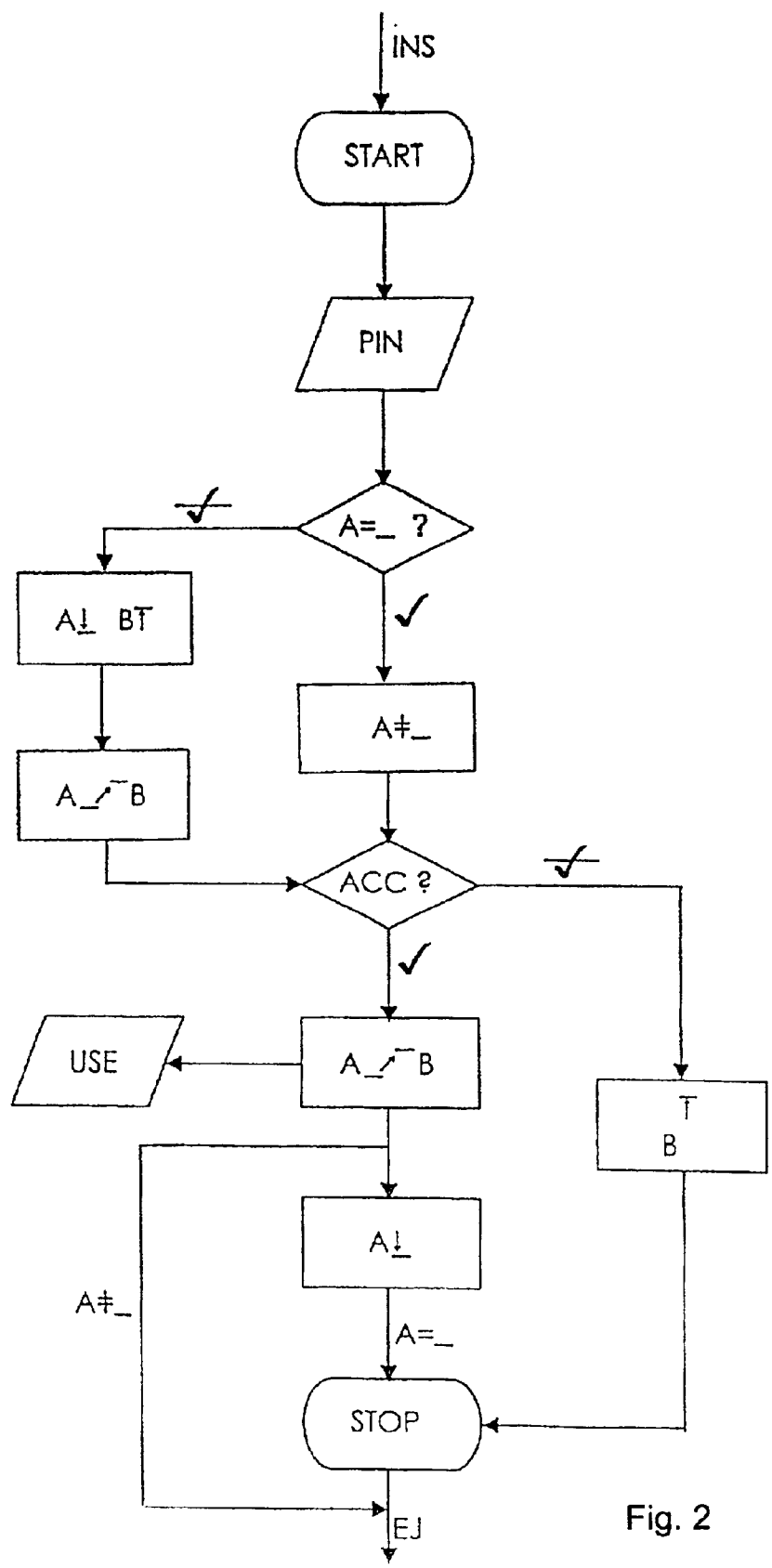
FIG. 2 is a flowchart illustrating a variation of the novel method.

A further exemplary embodiment, in which the procedure corresponding to the program flowchart in FIG. 2 is adopted, provides that, after the initialization and an interrogation which preferably takes place to determine whether the component to be approximated (floating gate cell A) is in the basic state (A=_ ?), an interrogation is first carried out to determine whether access authorization applies (ACC ?). If this is the case (ACC ? ✓), the values (basic value and reference value) of the electrical variable of the components are approximated; for example the turn-on voltage of the cell A is adjusted to the turn-on voltage of the cell B (A_↗¯B). During this process, the use of the function (USE) of the electronic device (for example the chip functions of the chip card) can already be enabled so that the user does not have to wait for the entire approximation process. The access time increases perceptibly only in the case of a repeatedly changed setting of the second component (cell B) owing to multiple faulty access attempts.

If it is determined at the start of the access attempt that the first component (cell A) is not in the basic state (A=_ ? not ✓), a delay of the access time is then preferably also provided in this exemplary embodiment. For this purpose, the first component is firstly adjusted to the basic state (the turn-on voltage of cell A is set to the basic value $U_{A0}$) and the reference value is changed (the turn-on voltage of cell B is changed, i.e. further increased in the example, A↓_ B↑¯). The checking of the access authorization (ACC ?) does not take place until a subsequent approximation of the values of the electrical variable of the components A_↗¯B). In order to prevent the analysis of a cryptoalgorithm, the access time is preferably increased in the cases in which an access attempt is aborted after the checking of the access authorization. This can be carried out easily by ensuring that the value of the electrical variable of the first component (cell A) is always different from the value in the basic state after the checking of the access authorization (ACC ?). When the values of the electrical variable of the components (A_↗¯B) have already been approximated, this is already so in any case. If the checking as to whether the component (cell A) to be approximated is in the basic state (A=_ ?) supplies a positive result, the value of the electrical variable of the first component can be set to a value (A≠_), for example, which is different from the basic state but ensures an adequate time period for the approximation to the value of the electrical variable of the second component (for example is somewhat lower or only a little higher than the value in the basic state).

If an absence of access authorization is determined (ACC ? not ✓), the reference value is also changed (the turn-on voltage of cell B is changed, B↑¯), so that the access time is prolonged at subsequent access attempts. In this exemplary embodiment also, the first component is reset to the basic state (the turn-on voltage of the cell A to $U_{A0}$, A↓_) after a terminated use (USE). After a premature abort of the access during the approximation process, this component is no longer in the basic state (A≠_). When there is a renewed access attempt, this triggers the described change in the state of the second component (cell B, A↓_ B↑¯).

This exemplary embodiment has the advantage that the access time is not delayed by the process of approximation of the basic value and reference value of the two components if the use of the electronic device (chip function) is already enabled during this process. When the use of the circuit is exclusively in accordance with the regulations, a prolonged access time is consequently only apparent after a multiplicity of faulty access operations.

Figure 3:
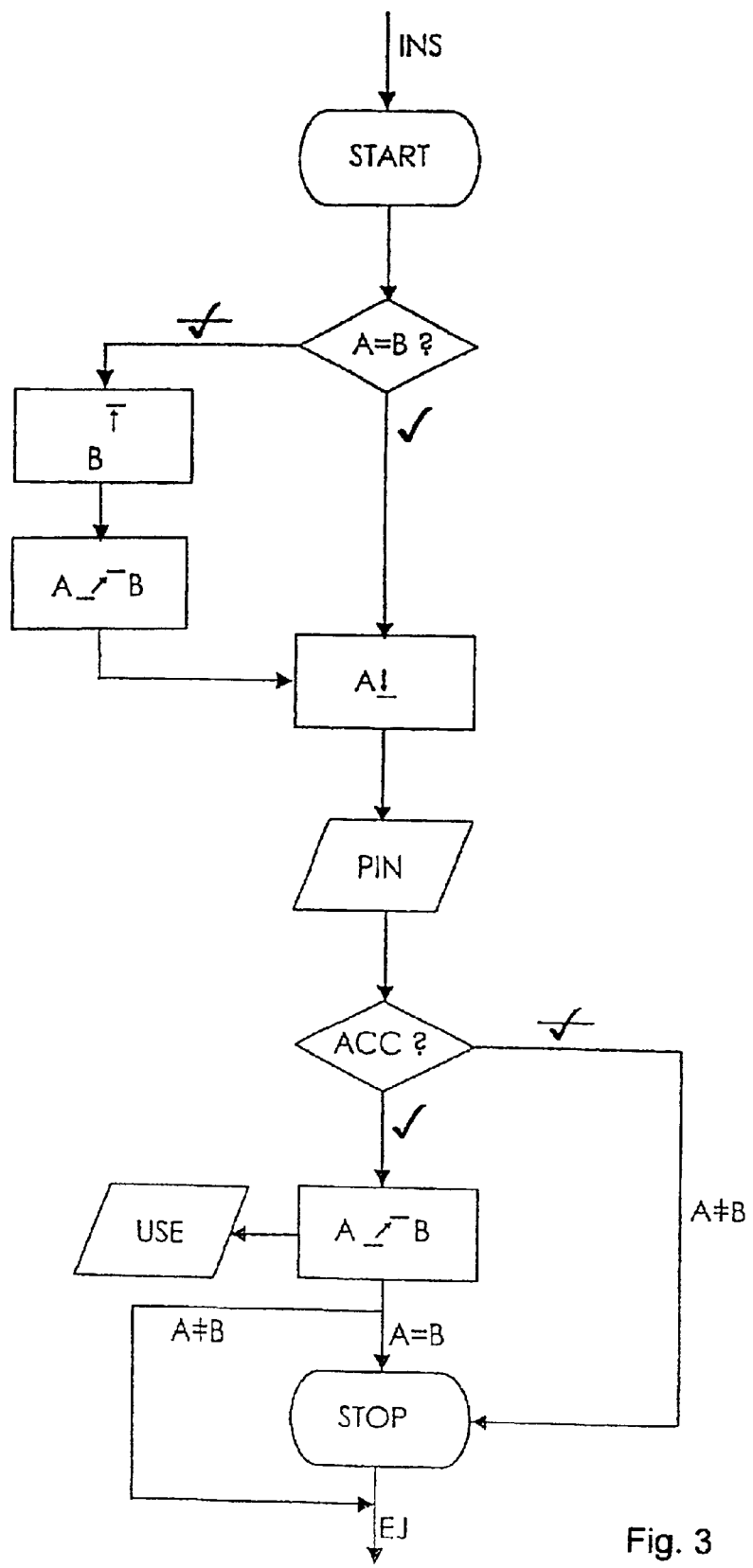
FIG. 3 is a flowchart illustrating a further variation.

A further exemplary embodiment, in which the procedure corresponding to the program flowchart in FIG. 3 is adopted, provides that, when there is satisfactory use of the circuit at the start, the electrical variable to be compared at the two components has the same value (A=B), i.e. in this exemplary embodiment both values are equal to the reference value in the basic state of the components. If this is not the case (A=B ? not ✓), the value of the second component (reference value) is changed in such a way that it takes a longer time interval for the reference value to be reached starting from the basic value of the first component than before (B↑¯) and a time delay is subsequently brought about, with approximation of the values of the electrical variable of the components (A_↗¯B). Then, the basic value is set (A↓_) in each case at the first component. If appropriate, data (PIN or the like) which is necessary for the checking of the access authorization is entered after this first interrogation. However, as in the previously described exemplary embodiments, this can also take place at the start (for example immediately after the insertion of a chip card INS→START).

Before or after the checking of the access authorization (ACC ?), the values of the electrical variable are approximated to one another by changing the basic value during a specific time interval and gradually approximating it (A_↗¯B) to the reference value. Use can already be enabled (USE) while this process is taking place if the access authorization has already been determined. After the values (A=B, if appropriate within unavoidable tolerances) have been approximated, both components are in the basic state which is characteristic of this exemplary embodiment and which permits renewed access without prolongation of the access time. If the access is denied (ACC ? not ✓) or if the access is prematurely aborted (no complete approximation), the values of the electrical variable at the two components are different from one another (A≠B), so that at the start of the next access attempt a change in the value (reference value) of the second component (B↑¯) is automatically brought about and a time delay is caused by the described process of approximation (A_↗¯B).

In order to be able to exclude manipulation by means of UV radiation in the exemplary embodiments with floating gate cells with different basic states (basic value not equal to the reference value), it is possible to provide a further cell C in the circuit in addition to the cell B whose turn-on voltage is successively increased after unsuccessful access attempts, said cell C being respectively placed in the opposite state to that of cell B. In some embodiments, this can be carried out by supplying the further cell C with pulses of equal height and duration as those supplied to the cell B, but with opposite polarity. The two cells B and C are preferably arranged adjacent to one another and provided with a difference in their turn-on voltages before the circuit is first used. If the two cells later exhibit the same turn-on voltage in any operating state, this can be taken as an indication that an attempt has been made to manipulate the circuit with UV radiation. Suitable countermeasures can then be taken.

By means of a suitable embodiment of the source/drain terminals of the cell B whose turn-on voltage is successively changed after unsuccessful access attempts, it is possible to prevent this turn-on voltage from being electrically reset to its initial value. It is thus possible to prevent the turn-on voltages being electronically approximated, and the security function of the circuit thus being bypassed.

The access authorization can, depending on the prevailing security requirements, be already checked during the process of approximation of the values of the components (charging of the one cell) or be checked only after approximation (of the turn-on voltages) has occurred completely. If the result of the interrogation (ACC ?) of the access authorization is that there is authorization for the electronic device to be used, this use is enabled and the access can take place. After successful termination of the access, the circuit brings about a reset with which at least the component of the circuit, whose value is changed in the approximation process (cell A), is reset to the predefined basic state. If the result of the interrogation of the access authorization is, on the other hand, that there is no authorized access attempt, either because there is no authorization or because there is a defect in the electronic device (terminal) which checks the authorization, there is a change in the access time in that the difference between the basic value of the first component and the reference value of the second component (for example the difference between the absolute values of the turn-on voltages of the cells) is increased. When there is a renewed access attempt, the access time is determined with the approximation of these values which are now adjusted to a larger difference. Depending on whether the interrogation results in there being authorization or no authorization, the access to the use of the electronic device is enabled or a change in the access time is brought about again.

With the circuit according to the invention it is necessary only for the first component to be reset to the basic state after each access has been satisfactorily terminated. However, the result of this is that, during the entire period of use of the circuit (for example service life of the chip card), any access which is not carried out in accordance with the regulations brings about a prolongation of the access time so that the use of the circuit is, under certain circumstances, severely adversely affected after some time. When there are low security requirements it is therefore possible to provide for both components (both cell A and cell B) to be reset to their respective basic states when there is satisfactory termination (STOP) of any authorized access. Alternatively it is possible to provide that such a complete reset is carried out only at the express command (corresponding inputting of data) of the user during an authorized access. The user of the circuit could in this case reset the access time to a low initial value after a number of faultily executed access operations.

Owing to the short access times which at most increase insignificantly when there are access attempts by authorized persons, this method is suitable for all applications, even for chips or chip cards which are used in a contactless fashion. Because the number of access attempts is not restricted in a specific time period when there is use according to the regulations, the method is suitable for all applications with a high access frequency. Even when there is a fault in a terminal and there are resulting rejected access attempts, the operational capability of a chip or of another protected electronic device is basically retained. This is an advantage over conventional locking out of a chip by means of a failed attempt counter.

We claim:

1. An electronic circuit for protecting electronic devices, comprising:
    a first component and a second component each having an electrical variable of the same type;
    a third component for comparing values of the electrical variable of the first component and of the second component with one another;
    a setting device for setting a value of the electrical variable of said first component and of said second component;
    a matching device for matching the value of the electrical variable of the first component to the value of the electrical variable of the second component, starting from a basic value, and during a given period of time;
    a checking device for checking whether an authorized use of the electronic device is properly initiated, executed, and terminated, and, in case of unauthorized or improper use, said checking device bringing about a change in the value of the electrical variable of the second component or a change in the matching device such that the period of time necessary to match the value of the electrical variable of the first component to the value of the electrical variable of the second component by the matching device is prolonged.

2. The circuit according to claim 1, wherein said checking device checks whether the value of the electrical variable of the first component is equal to a value which the electrical variable of the first component has after a use of the electronic device that is properly terminated.

3. The circuit according to claim 1, wherein said first component is a first floating gate cell and said second component is a second floating gate cell.

4. The circuit according to claim 3, wherein the electrical variable of said first and second components is a turn-on voltage, and wherein, in case of unauthorized or improper use, a value of the turn-on voltage of said second floating gate cell is changed.

5. A method of protecting electronic devices, which comprises:
    providing an electronic circuit with first and second components each having an electrical variable of the same type, and a device for setting a value of the electrical variable in each of the first and second components;
    ensuring that a use of the electronic device lasts at least as long as is required for an electronic process that takes a specific time to match a predefined basic value of the electrical variable of the first component to a respective value of the electrical variable of the second component functioning as a reference value; and
    as a result of an unauthorized access or as a result of an improper use, prolonging the specific time taken by the electronic process by one of changing the reference value and changing a speed of the matching operation.

6. The method according to claim 5, wherein the components of the circuit are two floating gate cells with adjustable turn-on voltages, and the electronic process is a delayed charging of one of the floating gate cells.

7. The method according to claim 5, which comprises:
    in a first step, checking whether the value of the electrical variable of the first component corresponds to a predefined basic value;

in a second step, if the value of the electrical variable of the first component corresponds to the predefined basic value, proceeding to the following third step and, if the value of the electrical variable of the first component does not correspond to the predefined basic value, setting the value of the electrical variable of the first component to the basic value and setting the value of the electrical variable of the second component to a new reference value, so that the specific time taken by the electronic process is prolonged;

in a third step, executing the electronic process until the values of the electrical variable of the two components match one another;

in a fourth step, checking whether authorization exists to use the electronic device;

in a fifth step, if authorization exists, rendering possible the use of the electronic device and, if authorization does not exist, setting the value of the electrical variable of the second component to a new reference value, so that the time taken by the electronic process is prolonged; and in a sixth step, setting the value of the electrical variable of the first component to the basic value.

8. The method according to claim 5, which comprises:

in a first step, checking whether the value of the electrical variable of the first component corresponds to a predefined basic value;

in a second step, if the value of the electrical variable of the first component corresponds to the predefined basic value, proceeding to the following third step and, if the value of the electrical variable of the first component does not correspond to the predefined basic value, setting the value of the electrical variable of the first component to the basic value and setting the value of the electrical variable of the second component to a new reference value, so that the specific time taken by the electronic process is prolonged, and executing the electronic process until the values of the electrical variable of the two components match one another;

in a third step, checking whether authorization exists to use the electronic device;

in a fourth step, if authorization exists, executing the electronic process until the values of the electrical variable of the two components correspond and rendering possible the use of the electronic device and, if authorization does not exist, setting the value of the electrical variable of the second component to a new reference value, so that the time taken by the electronic process is prolonged; and in a fifth step, setting the value of the electrical variable of the first component to the basic value.

9. The method according to claim 5, which comprises:

in a first step, checking whether the value of the electrical variable of the first component is equal to the value of the electrical variable of the second component;

in a second step, if the values of the electrical variables are equal, proceeding with the system to the following third step and, if the values are not equal, setting the value of the electrical variable of the second component to a new reference value, so that the time taken by the electronic process is prolonged;

in a third step, setting the value of the electrical variable of the first component to a predefined basic value different from the reference value;

in a fourth step, executing the electronic process until the values of the electrical variable of the two components correspond;

in a fifth step, checking whether authorization exists to use the electronic device; and in a sixth step, if authorization exists, rendering possible the use of the electronic device and, if authorization does not exist, setting the value of the electrical variable of the second component to a new reference value, so that the time taken by the electronic process is prolonged.

10. The method according to claim 5, which comprises:

in a first step, checking whether the value of the electrical variable of the first component is equal to the value of the electrical variable of the second component;

in a second step, if the values of the electrical variables are equal, proceeding with the system to the following third step and, if the values are not equal, setting the value of the electrical variable of the second component to a new reference value, so that the time taken by the electronic process is prolonged, and executing the electronic process until the values of the electrical variable of the two components correspond;

in a third step, setting the value of the electrical variable of the first component to a predefined basic value different from the reference value;

in a fourth step, checking whether authorization exists to use the electronic device;

in a fifth step, if authorization exists, executing the electronic process until the values of the electrical variable of the two components correspond and rendering possible the use of the electronic device and, if authorization does not exist, aborting the process.

* * * * *